April 20, 1965        E. MILIAS        3,178,861
APPARATUS FOR INCREASING GRINDING RATIO Filed Aug. 20, 1963        3 Sheets-Sheet 3

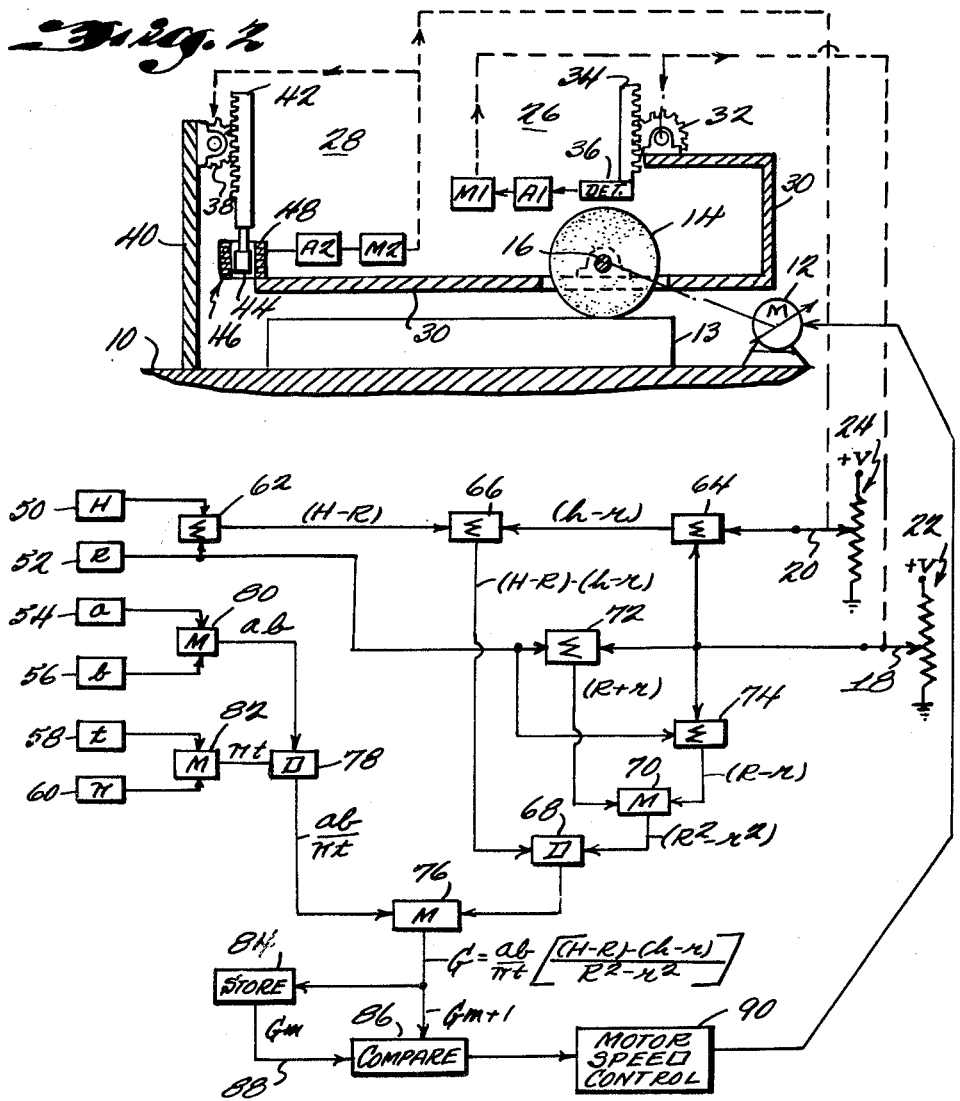

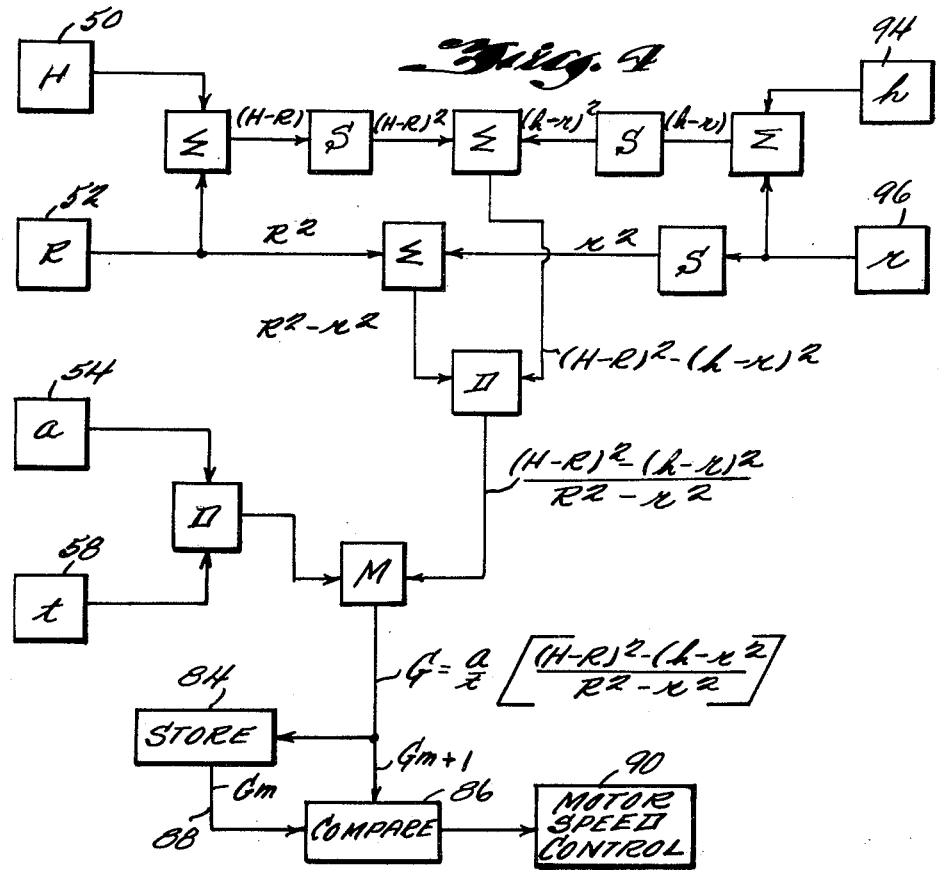

United States Patent Office 3,178,861
Patented Apr. 20, 1965

3,178,861
APPARATUS FOR INCREASING GRINDING RATIO
Emmanuel Milias, Worcester, Mass., assignor to Norton Company, Worcester, Mass., a corporation of Massachusetts
Filed Aug. 20, 1963, Ser. No. 303,305
13 Claims. (Cl. 51—165)

This application is a continuation-in-part of the application entitled "Grinding Machine," Serial No. 253,966, filed January 25, 1963, which, in turn, is a continuation of Serial No. 163,983, filed January 3, 1962, now abandoned.

The invention relates to apparatus for controlling a grinding operation to produce and maintain the optimum or maximum grinding ratio which may be defined as the ratio of the volume of metal removed from a workpiece to the volume of the material worn off the grinding wheel during a grinding operation.

It has been found that the grinding ratio can be made to increase and may be maintained at its peak during the grinding operation by changing the effective hardness of the grinding wheel as by changing its peripheral speed. Therefore, this invention has for its primary object the provision of an automatic control system for improving the grinding efficiency by automatically regulating the speed of relative rotation of the grinding wheel and workpiece in accordance with successive values of the grinding ratio.

In each of the herein described embodiments of the automatic control system, which embodiments respectively relate to different types of grinders such as surface, cylindrical, and internal grinders, the grinding ratio is continuously computed by a plurality of mathematically operating devices which receive signals representing various constant parameters and sensed variable parameters. The output of the computer means is concurrently provided to a store, or delay means, and to a comparing means whereby the last previous computed value of the grinding ratio may be compared with the currently computed value thereof to determine which is greater. If the current value is less than the last prior value, then the comparison means provides an output signal to the grinding wheel motor speed control to indicate thereto that the last prior direction of speed change should now be reversed, in order that the grinding ratio may be increased. On the other hand, if the currently computed grinding ratio is larger than the prior one, a signal to the motor speed control unit signifies that the present speed change direction should be continued.

Other objects, and embodiments of this invention, along with advantages thereof, will become apparent to those of ordinary skill in the art upon reading the following detailed description of the invention, in conjuncton with the drawings, in which:

FIGURE 1 is a diagram illustrating various initial and instantaneous dimensions of a grinding wheel and workpiece in front and side elevational views on a surface grinder;

FIGURE 2 is a first embodiment of the invention applicable to a surface grinding operation;

FIGURE 3 is a diagram illustrating various initial and instantaneous dimensions in a cylindrical type grinding operation;

Figure 5:
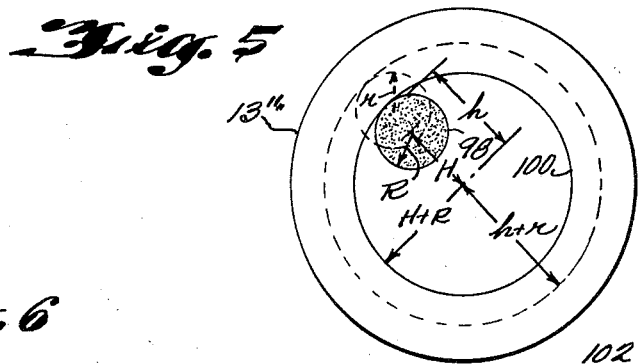
Figure 6:
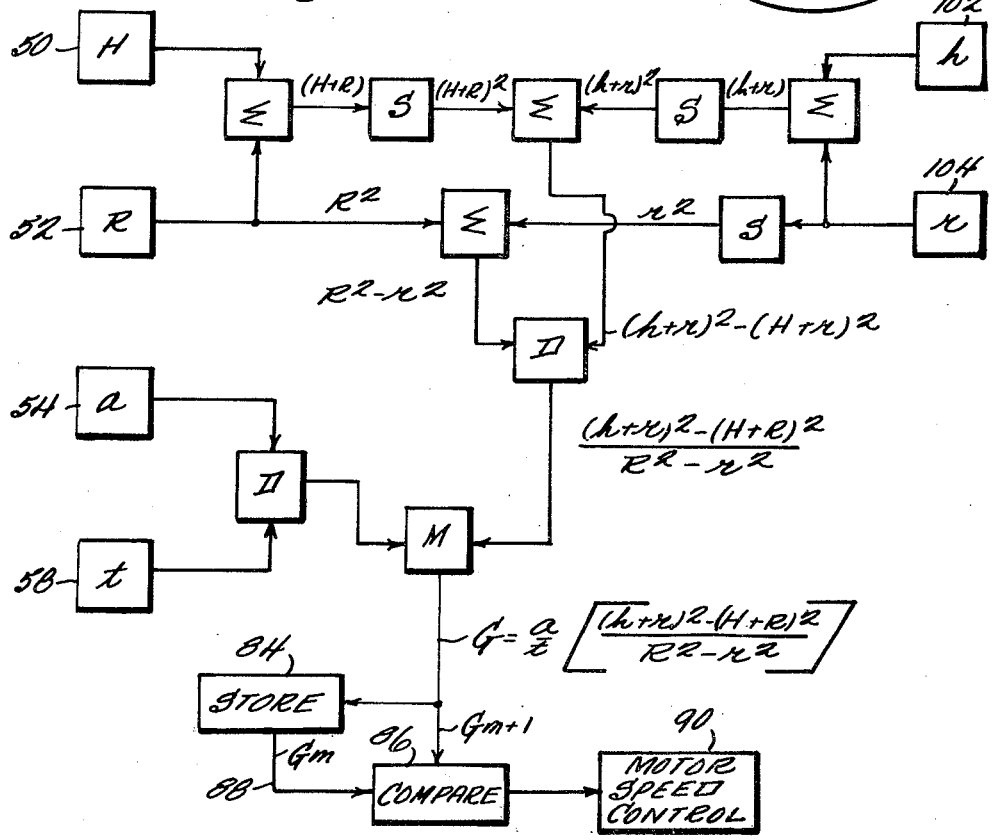

FIGURE 4 schematically and diagrammatically depicts an embodiment of the computing and control circuits for a grinding operation of the sort referred to by FIGURE 3;

FIGURE 5 diagrammatically indicates an internal grinding operation along with the various initial and instantaneous dimensions associated therewith; and FIGURE 6 schematically and diagrammatically illustrates an embodiment of computing and control circuitry for automatically controlling the grinding wheel speed in the type of grinding operation referred to by FIGURE 5.

The computing and control circuitry of this invention is applicable to any one of the different types of grinding machines referred to, for example, on page 6 of the handbook on "Abrasives and Grinding Wheels," published by the Norton Company, Worcester, Mass., the particular handbook here being referred to having a copyright designation of 1954, 1957, 1958 and 1961 by Norton Company. By reference, the contents of that handbook is hereby incorporated hereinto, and for the examiner's convenience a copy of the handbook is filed herewith to stay in the Patent Office file of this application.

Those familiar with the aforementioned application Serial No. 253,966 will recognize FIGURE 1 hereof as FIGURE 9 therein, and will also recognize the upper structural part of FIGURE 2, i.e., that part above the table support 10, except for motor 12, as FIGURE 10 of the parent application. The circuitry in FIGURE 2 below support 10 is partially similar to the circuitry in FIGURE 11 of that parent application.

In order to determine the grinding ratio, M may refer to the metal removed from the workpiece, while W refers to the wear on the grinding wheel, and the grinding ratio G therefore equals $M/W$. In FIGURE 1, the workpiece 13 is shown as having a length $b$, a width $a$, while grinding wheel 14 has a thickness $t$ in the direction of work width $a$, and an initial radius R. The initial center of wheel 14 is at 16, and is above a predetermined point of the workpiece, for example support 10, a distance H initially. As the workpiece is ground down a distance $y$, the instantaneous radius $r$ of the grinding wheel decreases, with the overall effect that the instantaneous wheel center 16 is at a distance $h$ from the base line on support 10. With these dimensional indications in mind, it is apparent that:

$$M = aby \quad (1)$$

where $$y = (H-R)-(h-r) \quad (2)$$

So, $$M = ab[(H-R)-(h-r)] \quad (3)$$

and $$W = \pi R^2 t - \pi r^2 t = \pi t (R^2 - r^2) \quad (4)$$

then, the grinding ratio G may be expressed as follows:

$$G = \frac{ab}{\pi t}\left[\frac{(H-R-(h-r)}{(R^2-r^2)}\right] \quad (5)$$

Equation No. 5 has only two variables, $h$ and $r$. In order to eliminate one of them for purposes of initial discussion, assume that wheel wear compensation exists so that $y$ in Equation No. 2 above is a constant. Then, G in Equation No. 5 would be the maximum when $R=r$. This means there would be no wheel wear, which may be true in theory but not in practice. This points up the need for an automatic control system which continuously computes the grinding ratio G from the existing parameters of Equation No. 5, compares successive G values, and directs the wheel speed to slow down or speed up in order that G may be maximized.

In FIGURE 2, the values $r$ and $h$ are respectively represented by voltages between ground and wipers 18 and 20 on potentiometers 22 and 24. These variable values are sensed and transformed into corresponding voltages by the respective servo systems 26 and 28.

Diagrammatically, the grinding wheel 14 in FIGURE 2 is shown engaged with the workpiece 13, with the wheel being rotatably fixed to a support frame 30 which moves downwardly with the grinding wheel during the grinding operation. Servo system 26 serves to constantly measure the radius of grinding wheel 14 and comprises a motor M1 which drives a pinion gear 32 that is fixedly secured rotatably on frame 30. This gear in turn drives a gear rack 34 on the lower end of which is a wheel wear sensing device 36. This device may be a magnetic pickup as described in Coes Patents 3,062,633 and 3,064,396, or it may be a capacitance type pickup. Of course, if it is of the magnetic type, then grinding wheel 14 must be made magnetically susceptible, or alternatively it must be electrically conductive to operate a capacitance pickup. In either event it is disposed adjacent the surface of the grinding wheel and is sensitive to a change in radius thereof. Such a change is fed as an electrical signal through an amplifier A1 to the motor M1. As the wheel radius $r$ diminishes and gear 32 is driven, the wiper 18 of potentiometer 22 is proportionally adjusted, and consequently the voltage from the wiper to ground is proportional to the instantaneous wheel radius $r$.

Servo system 26 serves to constantly measure the position of the center of the grinding wheel relative to a predetermined point on the workpiece for example, such as the base line or table support 10 as shown in FIGURE 1, i.e., it serves to provide a measure of the variable parameter $h$. It includes a motor M2 which drives a pinion gear 38 that is fixedly supported as by structure 40 at a predetermined height. This gear in turn drives a gear rack 42, which has mounted at its lower end a magnetic element 44 which is part of a position transducer 46. Coil 48 of the transducer is fixedly supported to frame 30 so as to move downwardly therewith as the grinding wheel operates. Such movement causes a displacement signal to be applied through amplifier A2 to motor M2 to effect a rebalance of the position transducer 46. As the center of the grinding wheel descends, the wiper 20 of potentiometer 24 is simultaneously adjusted proportionally by the mechanical output connection from motor M2, which in turn makes the voltage from wiper 20 to ground proportional to the instantaneous value of $h$.

Other parameters besides $h$ and $r$ that are involved in Equation No. 5 to determine the grinding ratio G, may be provided in proportional voltages in any desired manner, such as the provision of a fixed voltage, or the provision of a preset potentiometer output. In any event, these constant parameters are available in voltage form respectively from an H source 50, an R source 52, an $a$ source 54, a $b$ source 56, a $t$ source 58, and a $\pi$ source 60. The outputs of these sources are combined in a predetermined manner with the outputs of the variable sources $h$ and $r$. More particularly, FIGURE 2 illustrates a species of the combining means, which in effect is equivalent to the combining means shown in FIGURE 11 of the above mentioned parent application Serial No. 253,966. In this application, the combining circuitry carries out the specifics of Equation No. 5, and in so doing utilizes summers 62 and 64 for taking the algebraic summation of H, R and of $h$, $r$, respectively, which is the difference therebetween, i.e., $(H-R)$ and $(h-r)$. The difference of these two quantities is then taken by the algebraic summer 66 which applies its output to a divider 68. The other input to this divider carries a signal which is proportional to $(R^2-r^2)$ or the expansion thereof $(R+r)(R-r)$. This signal is obtained from multiplier 70 which multiplies the two expressions in this expansion as they are respectively obtained from the summers 72 and 74.

The output of divider 68 in the combining computer circuitry of FIGURE 2 is applied to a multiplier 76, the other input of which receives a signal from divider 78 which is proportional to the constant quantity $ab/\pi t$. The respective numerator and denominator inputs to divider 78 are obtained from multipliers 80 and 82. The grinding ratio output signal G, which is continuously obtained from multiplier 76, is therefore equal to the expression of Equation No. 5. This output signal is applied simultaneously to a store or delay means 84 and to a comparing means 86. Store 84 is such that it provides an output on line 88 at a predetermined delay time, which output is the same at the input thereto at the beginning of that time. Consequently, the two inputs to the comparing circuitry 86 are successive values, indicated $G_m$ and $G_{m+1}$ in the drawing, which get compared thereby.

It can be seen in the drawings that the various summers, multipliers, dividers and squarers are indicated respectively by the legends $\Sigma$, M, D, and S within a box in addition to the various reference characters which help in explaining their purpose.

Referring to FIG. 2, by applying the following rules:

(1) If $G_{m+1}<G_m$, Reverse speed direction
(2) If $G_{m+1}>G_m$, Continue present speed direction if the current value of the grinding ratio is less than the last prior value thereof, then it is necessary for the comparison circuitry 86 to provide a signal to the motor speed control 90 to cause it to reverse the direction of speed change motor 12 from that which it did the last time it compared successive ratios. On the other hand, if the circuitry value of the grinding ratio is greater than the last prior value thereof then comparison circuitry 86 provides a signal to the motor speed control 90 to prevent it from causing a reverse in the speed change direction.

From the foregoing description of FIGURES 1 and 2, it is apparent that surface type grinding machines may be speed controlled so as to maximize the grinding ratio automatically by using a grinding ratio computer along with circuitry for comparing successive grinding ratio values and a motor speed control responsive thereto. In a similar manner, other types of grinders may also be automatically controlled. For example, FIGURE 3 illustrates a cylindrical type grinding operation utilizing a grinding wheel 92 on the exterior of a cylindrical workpiece 13'. The various constants and variable parameters thereof, similar to those set forth in FIGURE 1 and described above, are also illustrated. To determine the grinding ratio $M/W$, where it will be recalled M refers to the mass or volume of metal removed from the workpiece and W refers to the volume of material worn off the grinding wheel, the following equations may be utilized:

$$M=a\left[\frac{\pi D^2}{4}-\frac{\pi(D-2y)^2}{4}\right] \quad (6)$$

but $$D=2(H-R) \quad (7)$$

and $$y=(H-R)-(h-r) \quad (8)$$

So, $$M=a\left[\frac{\pi D^2}{4}-\frac{\pi}{4}(D^2-4yD+4y^2)\right] \quad (9)$$

$$=a\left[\frac{\pi D^2}{4}-\frac{\pi D^2}{4}+\pi yD-\pi y^2\right]=\pi ay(D-y) \quad (10)$$

$$=a\pi[(H-R)-(h-r)][2(H-R)-(H-R)+(h-r)] \quad (11)$$

$$=a\pi[(H-R)^2-(h-r)^2] \quad (12)$$

Now $$W=\pi R^2 t-\pi r^2 t=\pi t(R^2-r^2) \quad (13)$$

so $$G=\frac{a}{t}\left[\frac{(H-R)^2-(h-r)^2}{R^2-r^2}\right] \quad (14)$$

Again, as in the surface grinder situation maximum G is achieved at $r$ equals R, which is a theoretical truth impossible to achieve in practice. Consequently, a similar control system is needed, as in the FIGURE 2 situation, and a block diagram thereof is illustrated in FIGURE 4.

In FIGURE 4, the $h$ and $r$ sources 94 and 96 are similar to those described for FIGURE 2, i.e., are servo operated for example to provide voltage signals which are proportional to the respective variable dimensions $h$ and $r$. It will be noted that the FIGURE 4 circuitry utilizes an H source 50, an R source 52 and $a$ and $t$ sources 54 and 58, but does not require the b and π sources 56 and 60 of FIGURE 2. It is believed, in view of the detailed discussion given above concerning the computer and control section of FIGURE 2, that no further explanation is necessary for the operation of the various mathematically operating devices in FIGURE 4 since their designations are legended and their operations are indicated mathematically adjacent their output lines. In this situation as in FIGURE 2, motor speed control 90 responds to the output of the comparing means 86 to reverse the direction of speed change only if the successively compared values of the grinding ratio G indicate that the current value is less than the next prior value.

In FIGURE 5, an internal grinding operation is depicted, whereby the grinding wheel 98 operates on the internal surface 100 of the workpiece 13″, which has an (unshown) length $a$, the grinding wheel having a thickness $t$ as in the prior situations. With the constant and variable dimensions as defined in FIGURE 5, the computing and control circuitry for maximizing the grinding ratio may be such as described and shown in FIGURE 6, then, the sources 102 and 104 for the variables H and R may be obtained in a manner similar to that discussed above relative to FIGURE 2. Since internal grinding is quite similar to cylindrical grinding, as expected the mathematics and computer circuitry are exactly the same, except that in the algebraic summation of H, R and $h$, $r$ these parameters are added instead of substracted as in the FIGURE 4 circuitry. That is, in FIGURE 6, R is added to H and $r$ is added to $h$ instead of being respectively subtracted therefrom as effected by the corresponidng algebraic summing devices in FIGURE 4. Otherwise, the operation of the FIGURE 6 circuitry is the same as previously described for FIGURE 4, and similar to the FIGURE 2 computer and control circuitry, whereby the speed of the grinding wheel 98 of FIGURE 5 is automatically regulated to increase and maximize the grinding ratio throughout the grinding process.

It will be appreciated that though specific computer arrangements have been illustrated, variations therein may be employed within the skill of the art. For example, though the bracketed numerator of Equations Nos. 5 and 14 is there written $(H-R)-(h-r)$ because of the specific grouping and type of equipment illustrated to effect the quantitiy, it could, and is in some of the claims below, written more generically as $(H-R-h+r)$ so as to include any of the ways of obtaining the quantity without question.

From the foregoing description, it is apparent that all of the objects and advantages herein mentioned have been successfully provided for. Other objects and advantages, end even modifications of the invention, will become apparent to those of ordinary skill in the art upon reading this disclosure. However, it is to be understood that this disclosure sets forth exemplary embodiments which are not to be considered limitative of the invention since the scope of the invention is defined in the appended claims.

What is claimed is:

1. Automatic control apparatus for improving the efficiency of grinding operation by a given grade grinding wheel on a workpiece during relative rotation thereof, comprising: variable speed drive means for producing said relative rotation,
   means for determining and comparing successive grinding ratios during the said grinding operation, and
   means under the control of said determining means for automatically regulating the speed of said relative rotation to maximize successive grinding ratios by reversing the speed change direction only if the currently determined one of said ratios is less than the next prior one thereof.

2. Automatic control apparatus for improving the efficiency of a grinding operation by a given grade grinding wheel on a workpiece during relative rotation thereof, comprising: variable speed drive means for producing said relative rotation,
   means for continuously computing the grinding ratio from certain parameters of said grinding operation,
   means for comparing successive values of said grinding ratio, and
   means responsive to the output of said comparing means for automatically regulating the speed of said relative rotation in the direction to maximize said grinding ratio.

3. Apparatus as in claim 2 wherein said comparing means includes
   a comparator coupled to said computing means for receiving computed grinding ratio values successively, and
   means coupled to said computing means for storing and presenting the next-to-last computed grinding ratio value to said comparator concurrently with the receipt thereby of the current computed ratio.

4. Apparatus as in claim 2 wherein the grinding ratio computing means includes means for determining the ratio of the volume of said workpiece removed to the volume worn off said grinding wheel during the grinding operation.

5. Apparatus as in claim 2 including means for providing
   (A) signals representing certain constant parameters including initial wheel radius R, wheel thickness $t$, the dimension $a$ of said workpiece in the direction of $t$, and the dimension H from the initial wheel center to a constant point of said workpiece, and
   (B) signals representing certain variable parameters including the instantaneous wheel radius $r$, and the instantaneous dimension $h$ from the instantaneous wheel center to said constant workpiece point,
   said combining means including mathematic means for continuously computing at least a part of the said grinding ratio as the function $$\frac{a}{t}\left[\frac{H-R-h+r}{R^2-r^2}\right]$$

6. Apparatus as in claim 2 including means for providing
   (A) signals representing certain constant parameters including initial wheel radius R, wheel thickness $t$, the dimension $a$ of said workpiece in the direction of $t$, and the dimension H from the initial wheel center to a constant point of said workpiece, and
   (B) signals representing certain variable parameters including the instantaneous wheel radius $r$, and the instantaneous dimension $h$ from the instantaneous wheel center to said constant workpiece point,
   said combining means including
   (C) means for effectively squaring the R and $r$ signals and taking the difference between the squared signals to effect a first output signal,
   (D) means for effecting a second output signal effectively representing the quantity $(H-R-h+r)$,
   (E) means for effectively dividing said first output signal by said second output signal and multiplying by the quantity $a/t$.

7. Apparatus as in claim 2 including means for providing
   (A) signals representing certain constant parameters including initial wheel radius R, wheel thickness $t$, the dimension $a$ of said workpiece in the direction of $t$, and the dimension H from the initial wheel center to a constant point of said workpiece, and
   (B) signals representing certain variable parameters including the instantaneous wheel radius $r$ and the instantaneous dimension $h$ from the instantaneous wheel center to said constant workpiece point
   said combining means including
   (C) means for squaring R and $r$ (D) means for taking the difference between the squares,
(E) means for algebraically combining $r$ with $h$ and $R$ with $H$,
(F) means for subtracting a form of $r$ and $h$ from a form of $R$ and $H$ as combined by means (E), and
(G) means for dividing the outputs of means (F) and (D) and multiplying same by at least $a/t$.

8. Automatic control apparatus for improving the efficiency of a grinding operation by a given grade grinding wheel on a workpiece during relative rotation thereof, comprising:
   means for automatically controlling the speed of said relative rotation in accordance with a control signal,
   means for providing signals representing certain initial dimensional values, and instantaneous variations in at least some of those values, of said workpiece and grinding wheel during the said grinding operation,
   means for combining said signals in a predetermined manner to provide an output signal representing the current grinding ratio of said grinding operation, and
   means for comparing successive values of said output signal to produce said control signal and effect such speed control as to maximize successive grinding ratios by reversing the direction of speed change only if the current grinding ratio is less than the next prior one.

9. Apparatus as in claim 8 wherein said grinding operation is a surface grinding operation and
   said wheel has an initial radius $R$, an instantaneous radius $r$, and a thickness $t$,
   said workpiece having a width $a$ in the direction of $t$ and a length $b$ with said wheel being disposed to operate lengthwise on one face of the workpiece with its center being an initial distance $H$ and an instantaneous distance $h$ from the face opposite said one face of the workpiece,
   said combining means including computing means for determining at least a part of the grinding ratio as the function $$\frac{ab}{t\pi}\left[\frac{H-R-h+r}{R^2-r^2}\right]$$

10. Apparatus as in claim 8 wherein the providing means and combining means operate continuously during the grinding.

11. Apparatus as in claim 8 wherein said grinding operation is a surface grinding operation and
   said wheel has an initial radius $R$, an instantaneous radius $r$, and a thickness $t$,
   said workpiece having a width $a$ in the direction of $t$ and a length $b$ with said wheel being disposed to operate lengthwise on one face of the workpiece with its center being an initial distance $H$ and an instantaneous distance $h$ from the face opposite said one face of the workpiece,
   said combining means operating to cause its said output signal to represent the grinding ratio $G$ effectively as $$G=\frac{ab}{\pi t}\left[\frac{H-R-h+r}{R^2-r^2}\right]$$

12. Apparatus as in claim 8 wherein said grinding operation is an external cylinder grinding type and
   said wheel has an initial radius $R$, an instantaneous radius $r$, and a thickness $t$,
   said workpiece being cylindrical and having a length $a$,
   said combining means operating to cause its said output signal to represent one of the following grinding ratios $G$:

$$G=\frac{a}{t}\left[\frac{(H-R)^2-(h-r)^2}{R^2-r^2}\right]$$

13. Apparatus as in claim 8 wherein said grinding operation is an internal grinding type and
   said wheel has an initial radius $R$, an instantaneous radius $r$, and a thickness $t$,
   said workpiece being cylindrical and having a length $a$,
   said combining means operating to cause its said output signal to represent one of the following grinding ratios $G$:

$$G=\frac{a}{t}\left[\frac{-(H+R)^2+(h+r)^2}{R^2-r^2}\right]$$

References Cited by the Examiner
UNITED STATES PATENTS

| | | | |
|---|---|---|---|
| 1,949,975 | 3/34 | Reeves | 51—134.5 |
| 2,947,121 | 8/60 | Coes | 51—134.5 |

LESTER M. SWINGLE, *Primary Examiner.*